(12) United States Patent
Pawlik

(10) Patent No.: US 12,143,731 B1
(45) Date of Patent: Nov. 12, 2024

(54) HIGHLIGHT RECOVERY FOR IMAGE SENSORS

(71) Applicant: Amazon Technologies, Inc., Seattle, WA (US)

(72) Inventor: Bartlomiej Pawlik, Singapore (SG)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 336 days.

(21) Appl. No.: 17/854,656

(22) Filed: Jun. 30, 2022

(51) Int. Cl.
*H04N 23/88* (2023.01)
*G06T 7/90* (2017.01)
*H04N 9/64* (2023.01)

(52) U.S. Cl.
CPC ............. *H04N 23/88* (2023.01); *G06T 7/90* (2017.01); *H04N 9/646* (2013.01); *G06T 2207/10024* (2013.01)

(58) Field of Classification Search
CPC .... H04N 23/843; H04N 23/88; H04N 25/131; H04N 25/135; H04N 9/69; H04N 9/646; G06T 7/90
See application file for complete search history.

(56) References Cited

U.S. PATENT DOCUMENTS

| | | | |
|---|---|---|---|
| 12,041,365 B2* | 7/2024 | Cote | H04N 9/64 |
| 2013/0322753 A1* | 12/2013 | Lim | G06T 5/73 |
| | | | 382/167 |

* cited by examiner

*Primary Examiner* — Antoinette T Spinks
(74) *Attorney, Agent, or Firm* — K&L Gates LLP

(57) ABSTRACT

Techniques are generally described for highlight recovery for image sensors. In some examples, a first frame of image data comprising a first pixel may be received. The first pixel may include a value $C_{i,c}$ where $c \in (R, G, B, IR)$. A white balance gained value $C_{i,c}^{wb}$ may be determined using $C_{i,c} \cdot WB_c$, where $WB_c$ represents a per-color channel white balance gain. A color-corrected value $C_i^{ccm}$ may be determined based at least in part on $C_{i,c}^{wb}$ and a color correction matrix. An interpolation coefficient $\alpha$ may be determined based at least in part on a clipped representation of the color-corrected value $C_i^{ccm}$. A second value $C_i^{out}$ may be determined for the first pixel by interpolating between an unclipped representation of the first pixel and an unclipped representation of $C_i^{ccm}$ using $\alpha$.

22 Claims, 13 Drawing Sheets
(6 of 13 Drawing Sheet(s) Filed in Color)

HIGHLIGHT RECOVERY FOR IMAGE SENSORS

BACKGROUND

Cameras and other image sensors may be used to capture images and/or videos of a physical environment, sometimes for surveillance or monitoring certain areas of interest. Some cameras include image sensors effective to detect light in both the visible and infrared (IR) spectrums, which enable the operation of those cameras in day and night modes. The photosensors included in image sensors typically detect light intensity with little or no wavelength specificity, preventing the sensors from separating color information in the captured light signal. White balancing is used to compensate for different color temperatures of light illuminating the scene so that the image colors appear more natural. In some examples, color correction is applied after white balancing in order to correct the color space (and/or to account for inaccuracies in white point estimation).

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
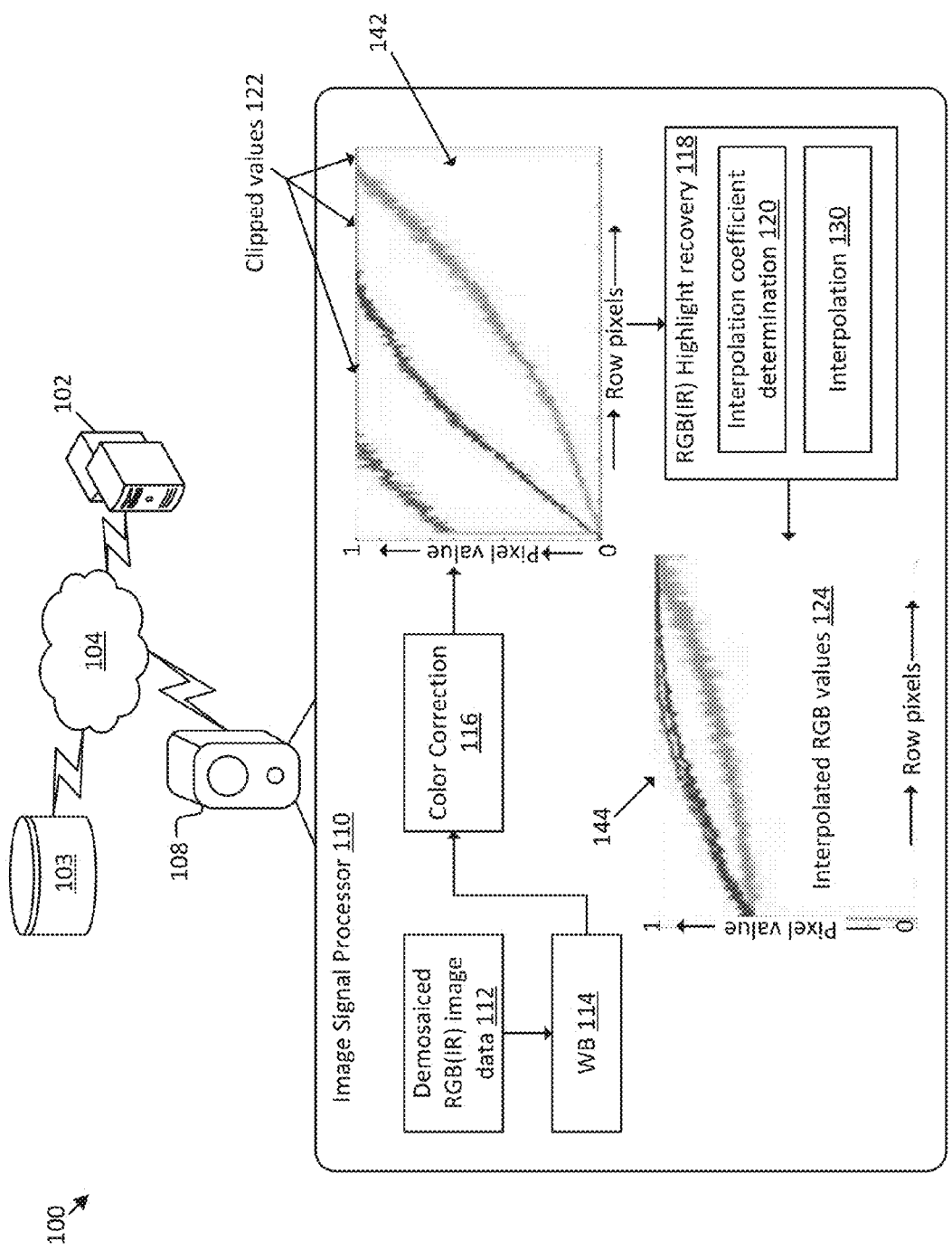
FIG. 1 is a block diagram of a system including a camera device with an image signal processor configured to implement highlight recovery, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In digital cameras, light is focused by one or more lenses (or other optical elements) onto an array of photosensors in an image sensor with each photosensor corresponding to a pixel. The photosensors convert the incoming light (photons) into electrical signals that can be stored, analyzed, and/or used to generate an image on a display. The photosensors of an image sensor are typically arranged in a grid (e.g., a two-dimensional pattern) with photosensors arranged in rows of aligned photosensors and columns of aligned photosensors. Each photosensor corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture. Image sensors are solid state devices. Examples of different types of image sensors include charged couple device (CCD) sensors and complementary metal-oxide semiconductor (CMOS) sensors. In general, a frame of image data refers to any set of image data values that may be considered together for some purpose. For example, each photosensor/pixel of an image sensor may capture individual pixel information. The pixel information may be considered as a group when arranged into a frame of a two-dimensional grid. Each position in the grid may be referred to as a "pixel" and each pixel may be associated with a pixel value that represents the intensity of light captured by the photosensor that corresponds to the pixel. Accordingly, in some examples, a pixel may be represented as a two-dimensional coordinate.

Color filter arrays (CFAs), which are comprised of a mosaic of color filters, are placed over the pixel sensors of the image sensor to capture a mosaic of color information. However, in a typical CFA implementation, any given pixel has color information for only a single color (corresponding to the color filter associated with that pixel in the CFA). CFA interpolation techniques (sometimes referred to as "demosaicing") interpolate color information from surrounding pixels to determine a full color image from the incomplete color information output by the image sensor overlaid with the CFA. Demosaicing is typically performed by an image signal processor which may either be included in the digital camera device or may be located remotely.

As previously described, the photosensors detect light intensity but, without more, are unable to separate different the intensity information for different wavelengths of light. Accordingly, the photosensors are not able to generate color information from the received light. CFAs include color filters that only allow certain wavelengths of light to pass. A CFA includes a pattern of such color filters where each pixel of the photosensor array corresponds to a single color filter from the CFA. Accordingly, each photosensor receives light that corresponds to a particular color. CFA patterns have been developed to allow for interpolation from surrounding pixels in order to determine color information for all relevant "missing" color channels.

For example, a photosensor may be overlaid with a light filter in the CFA that allows light of wavelengths between approximately 625-740 nanometers (nm) to pass. The pixel corresponding to this photosensor may be referred to as a "red pixel" as this is the approximate wavelength range of red light. Similarly, a pixel associated with a photosensor that is overlaid with a light filter in the CFA that allows light of wavelengths between approximately 435-500 nm to pass may be referred to as a "blue pixel" and a pixel associated with a photosensor that is overlaid with a filter in the CFA that allows light of wavelengths between approximately 520-565 nm to pass may be referred to as a "green pixel." In some examples described herein, photosensors that are sensitive to light in the near infrared range (NIR) may be used. Accordingly, the CFA for such image sensors may include NIR (sometimes referred to herein as "IR") filters that allow light of wavelengths in the infrared range to pass (e.g., from approximately 780-1100 nm). A pixel associated with a photosensor that is overlaid with a filter in the CFA that allows light of wavelengths between approximately 780-1100 nm to pass may be referred to as an "IR pixel" or an "infrared pixel."

Demosaicing refers to an algorithm that may be implemented by an image signal processor that determines the "missing" values for each pixel based on nearby pixels in the frame (e.g., using interpolation). For example, demosaicing may be used to determine the red, blue, and infrared values for a given "green" pixel. After demosaicing, each pixel has a full complement of color values (e.g., red, green, blue, and IR if an infrared photosensor is used).

For example, a simple demosaicing algorithm may interpolate the color value of the pixels of the same color in the neighborhood. For example, once the image sensor chip has been exposed to an image, the value of each pixel can be read. A pixel with a green filter provides an exact measurement of the green component. The red and blue components for this pixel may be obtained from the neighbors. For example, for a green pixel, two red pixel neighbors can be interpolated to yield the red value, and two blue pixels can be interpolated to yield the blue value. Other, more sophisticated demosaicing approaches may be used to account for changing colors, irregular gradients, abrupt changes in color or brightness (such as along sharp edges or visual transitions in the image), etc.

The human eye perceives color differently relative to image sensors. When a human sees a specific object under different light sources, the human visual system can adapt to different illumination changes to see a color (e.g., of a white wall) as a relatively constant color. This is sometimes referred to as "chromatic adaptation" where the optical centers in the brain adjust the intensity of cone cell responses from the eye. However, image sensors in digital cameras have a fixed spectral response. This means that for different illuminance on a scene (e.g., for different color temperature of the light source illuminating a scene), absent white-balancing, the color of the same white wall will appear to change as the illumination changes. White balancing is used to apply different gains for different color channels (e.g., red, green, blue, infrared) so that colors appear constant (e.g., the color appearance of the same white wall) under changing light conditions.

As described above, without additional processing, image sensors cannot recognize color temperature and thus cannot automatically adjust the color. This can lead to color distortion. As such, without white balancing and color correction, if a digital camera captures an image of the white wall on a sunny afternoon and then again at sunset, the wall will have a different color in each image because the camera has not adopted the correct color temperature. White balance gains (and color correction matrix (CCM) values) may be determined using statistics gathered during calibration of the image sensor. Such calibration statistics may include auto-white balance statistics, auto-exposure statistics, and auto-focus statistics. Collectively, these statistics are often referred to as "3A statistics." The 3A statistics may be stored in memory and may be used to determine the white balance gains and/or the CCM.

Additionally, the human eye has a fixed spectral sensitivity, which is different from the spectral sensitivity of image sensors. The CCM is used to map the spectral sensitivities of the image sensor to those of the human eye so that the colors the same or similar to what is perceived with the human eye. CCM is applied after white-balancing and is illumination dependent so CCM is applied for changing lighting conditions and light sources.

Some photosensors are sensitive to light in the infrared (IR) portion of the spectrum During night time and/or in other low-lighting settings, the IR information may allow the image sensor to receive enough light to generate to generate images in spite of the low amount of light in the visible spectrum. During daylight and/or capturing images in highly-illuminated settings, IR information may be removed as IR light may lead to color distortion. In some devices, a dedicated IR removal component (e.g., an IR cut filter or a software component used to subtract IR information during image processing) may be used. However, other image sensors may treat IR information as another dimension of the image and not as a contaminant to the image. Such image sensors may use a 4×3 matrix operation that takes 4 channels at input (R, G, B, and IR) and outputs 3 channels (R, G, B) eliminating the IR removal component. In such examples, the IR information may be used to better estimate the colors during daylight and/or other highly illuminated settings. In such examples, the CCM may be a 4×3 matrix with the row corresponding to IR being negative to remove the IR information from the image.

In various examples, white balance gained pixel values are clipped after performing white balancing. This clipping is performed because the CCM is determined using a known color space. Clipping after white balancing puts some color channels into saturation (e.g., those color channels with values greater than 1). However, negative values in the CCM, when applied to clipped color channel values, can result in false colors it the white point is over- or under-estimated during white-balancing. This is particularly prevalent in RGB-IR image sensors that use 4×3 CCMs to subtract IR information since the IR row of the CCM in such image sensors always includes negative values.

Described herein are highlight recovery techniques for image signal processors that may be used to prevent such false colors by interpolating between an unclipped, white balance gained, and color-corrected pixel value and a representation of the input pixel (e.g., input pixel luma and/or an unclipped white-balance gained pixel multiplied by an identity matrix). An interpolation coefficient α is used that gives higher weight to the representation of the input pixel (e.g., input pixel luma) the closer the average R, G, B values are to clipping. Similarly, the interpolation coefficient α gives higher weight to the unclipped, white balance gained, and color-corrected pixel value as the average R, G, B values move further away from clipping. Although it may be counterintuitive to interpolate between the pixel color values and pixel luma (which is essentially gray in color), luma clips later than RGB color values and thus includes detail that would otherwise be clipped (if interpolating between unclipped, white balance gained, and color-corrected pixel RGB values and unclipped white balance gained (but non-color-corrected) pixel RGB values). Accordingly, the interpolation coefficient α favors input pixel luma when pixel RGB values are close to saturation and favors the white balance-gained, color corrected pixel values when pixel RGB values are further away from saturation. This interpolation helps to prevent false coloring and recover highlights in the resulting image.

FIG. 1 is a block diagram of a system 100 including a camera device 108 with an image signal processor 110, one or more computing devices 102, and one or more non-transitory computer-readable memories 103, arranged in accordance with various aspects of the present disclosure. In various examples, the one or more computing devices 102 may be configured in communication over a network 104. In some examples, the RGB (IR) highlight recovery 118 may be implemented in image signal processor 110, which may be either implemented in a device (e.g., camera device 108) or which may be located remotely with respect to a camera device (e.g., in the one or more computing devices 102). For example, one or more of the techniques used by the RGB (IR) highlight recovery 118 may be performed using an application specific integrated circuit (ASIC) and/or using a field programmable gate array (FPGA). Network 104 may be a communication network such as a local area network (LAN), a wide area network (such as the Internet), or some combination thereof. The one or more computing devices 102 and/or the camera device 108 may communicate with non-transitory computer-readable memory 103 (e.g., either locally or over network 104). The non-transitory computer-readable memories 103 may store instructions that may be effective to perform one or more of the various techniques described herein.

In various examples, an image sensor of the camera device 108 (not shown in FIG. 1) may capture an image (e.g., a frame of raw pixel data). The pixel data may be demosaiced to determine red (R), green (G), blue (B), and infrared (IR) values for each pixel of the input frame of image data, resulting in demosaiced RGB (IR) image data 112. White balance component 114 may apply a white balance gain to each channel of each pixel based on the estimated white point for the current illumination source(s) on the scene represented by the input image data.

For example, $C_{i,c}$ may represent a value of a color c of a pixel at index location i in the input frame of image data, where c∈(R, G, B, IR) where R is a red color channel, G is a green color channel, B is a blue color channel, and IR is an infrared color channel. The white balance gains for the image may be $WB_c$ which may be a 1×4 matrix with respective white balance gains for each of the R, G, B, and IR color channels. The white balance gained pixel color values may be determined as:

$$C_{i,c}^{wb} = C_{i,c} \cdot WB_c$$

Although not shown in FIG. 1, the output of the white balance component 114 $C_{i,c}^{wb}$ may be clipped to limit the color channel values between 0 and 1, as shown below:

$$C_{i,c}^{wb,clipped} = \max(0,(1,C_{i,c}^{wb}))$$

As previously described, the white balance gained pixel values may be clipped for compatibility with the CCM applied by color correction component 116. Color correction component 116 may multiply $C_{i,c}^{wb,clipped}$ (a 1×4 matrix) by the 4×3 CCM to generate $C_i^{ccm}$ (e.g., RGB color values for the pixel). Again, although not shown in FIG. 1, the output of the color correction component 116 ($C_i^{ccm}$) may be clipped to values between 0 and 1, as shown below:

$$C_i^{ccm,clipped} = \max(0,\min(1,C_i^{wb,clipped} \cdot CCM))$$

Figure 2:
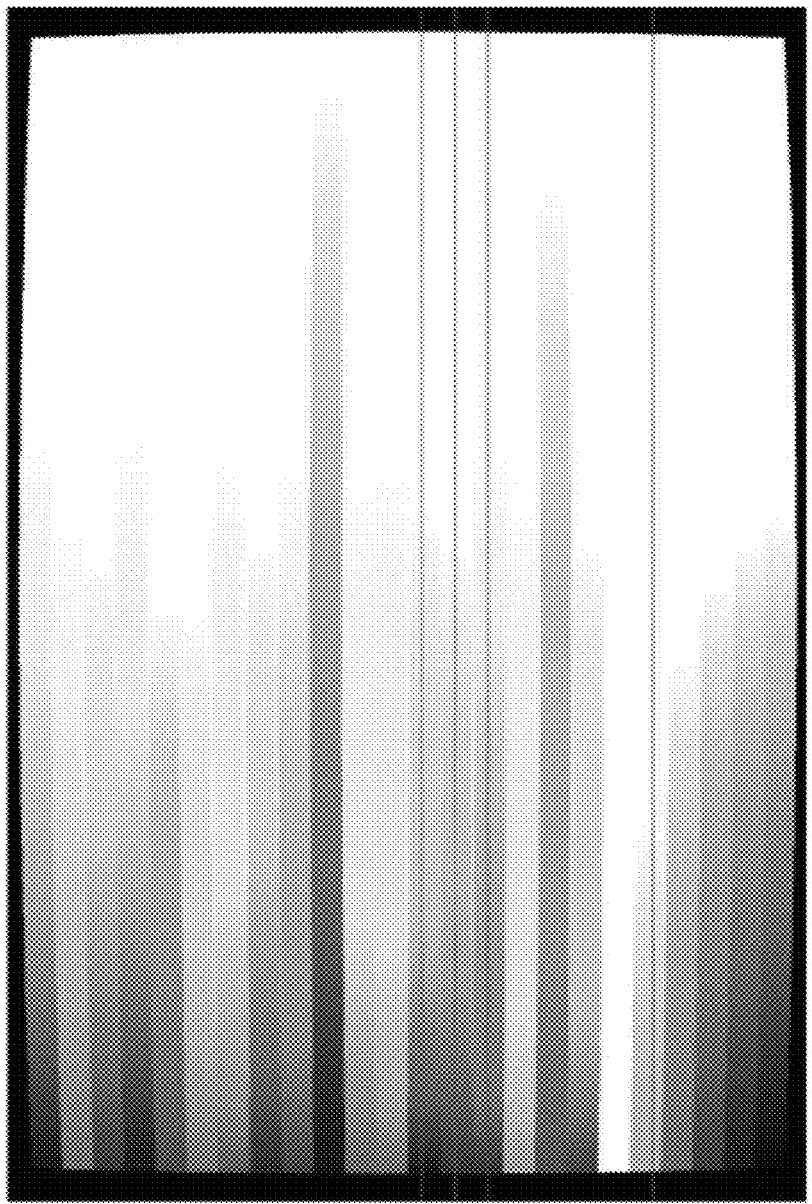
FIG. 2 is an example input image that includes rows of pixels with pixel values increasing from left to right along different rows, in accordance with various aspects of the present disclosure.

A horizontal profile 142 of an example row of pixels in an input image is shown in FIG. 1. The horizontal profile 142 corresponds to pixels (with pixel values that are gradually increasing) in a single row in the input image of FIG. 2 after white balance gain, color correction, and clipping. FIG. 2 depicts an example of such an input image, which may be used for visualization purposes to illustrate different saturation points for different rows of pixels. As shown in horizontal profile 142, the red, green, and blue channel values clip (e.g., become saturated at pixel value 1) at different points in the row of pixels. As described in further detail below, applying the 4×3 CCM with negative values in the IR row may lead to false colors when applied on clipped, saturated color values (e.g., clipped values 122). Note that this can also occur with traditional RGB Bayer sensors when the 3×3 CCM includes negative values. Accordingly, RGB (IR) highlight recovery 118 may interpolate between the unclipped, white balance gained, and color-corrected pixel value and the input pixel luma (using interpolation 130, discussed in further detail below). The clipped representation of the color-corrected values ($C_i^{ccm,clipped}$ (represented by the horizontal profile 142) may be used to determine the interpolation coefficient $α_i$ (interpolation coefficient determination 120, discussed in further detail below). The interpolation coefficient $α_i$ is used during interpolation 130 to give higher weight to the representation of the input pixel (e.g., input pixel luma) the closer the average R, G, B values are to clipping. Similarly, the interpolation coefficient $α_i$ gives higher weight to the unclipped, white balance gained, and color-corrected pixel value as the average R, G, B values move further away from clipping. Accordingly, as shown in horizontal profile 144, the saturation (clipping) point for the different color channels is moved further to the right to recover color highlights while preventing false colors. The pixels represented by horizontal profile 144 represent interpolated RGB values 124 (interpolated using the RGB (IR) highlight recovery 118.

Figure 3:
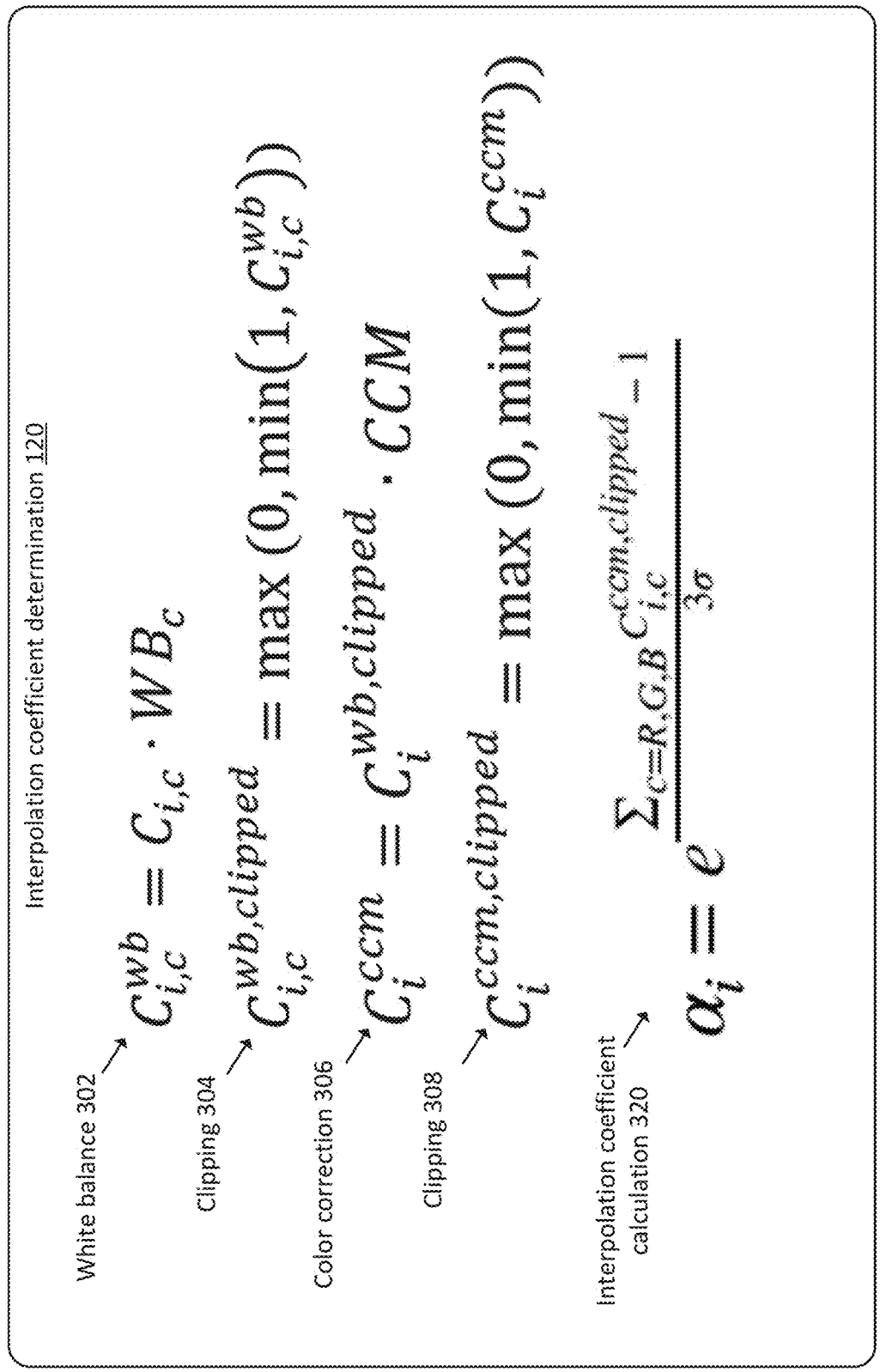
FIG. 3 depicts an example determination of an interpolation coefficient that may be used for highlight recovery in various examples described herein.

FIG. 3 depicts an example determination of an interpolation coefficient that may be used for highlight recovery in various examples described herein. The interpolation coefficient determination 120 performed in FIG. 3 may be performed as part of RGB (IR) highlight recovery 118 of FIG. 1. After demosaicing, automatic white balancing (white balance 302) may be performed for each pixel using:

$C_{i,c}^{wb} = C_{i,c} \cdot W B_c$, where $W B_c$ is a 1×4 matrix of per-channel (e.g., RGB-IR) (or a 1×3 matrix for an RGB Bayer sensor) white balance gains, determined as described in further detail below.

The white balanced values may be clipped (clipping 304) to limit the values to between 0 and 1 using:

$C_{i,c}^{wb,clipped} = \max(0, \min(1, C_{i,c}^{wb}))$ to conform with the CCM learned during calibration. Thereafter, color correction (color correction 306) may be performed by multiplying the clipped, white balance-gained pixel values by the 4×3 CCM (for RGB-IR image sensors):

$$C_i^{ccm} = C_{i,c}^{wb,clipped} \cdot CCM.$$

Thereafter, the color-corrected pixel values may be clipped (clipping 308) to limit the values to between 0 and 1:

$C_{i,c}^{ccm,clipped} = \max(0, \min(1, C_i^{ccm}))$. These clipped, color-corrected, and white balance gained pixel values may be used to determine the interpolation coefficient $\alpha_i$ (interpolation coefficient calculation 320), using:

$$\alpha_i = e^{\frac{\sum_{c=R,G,B} C_{i,c}^{ccm,clipped} - 1}{3\sigma}},$$

where $\sigma$ is a tunable parameter that controls the strength of highlight recovery.

Figure 4:
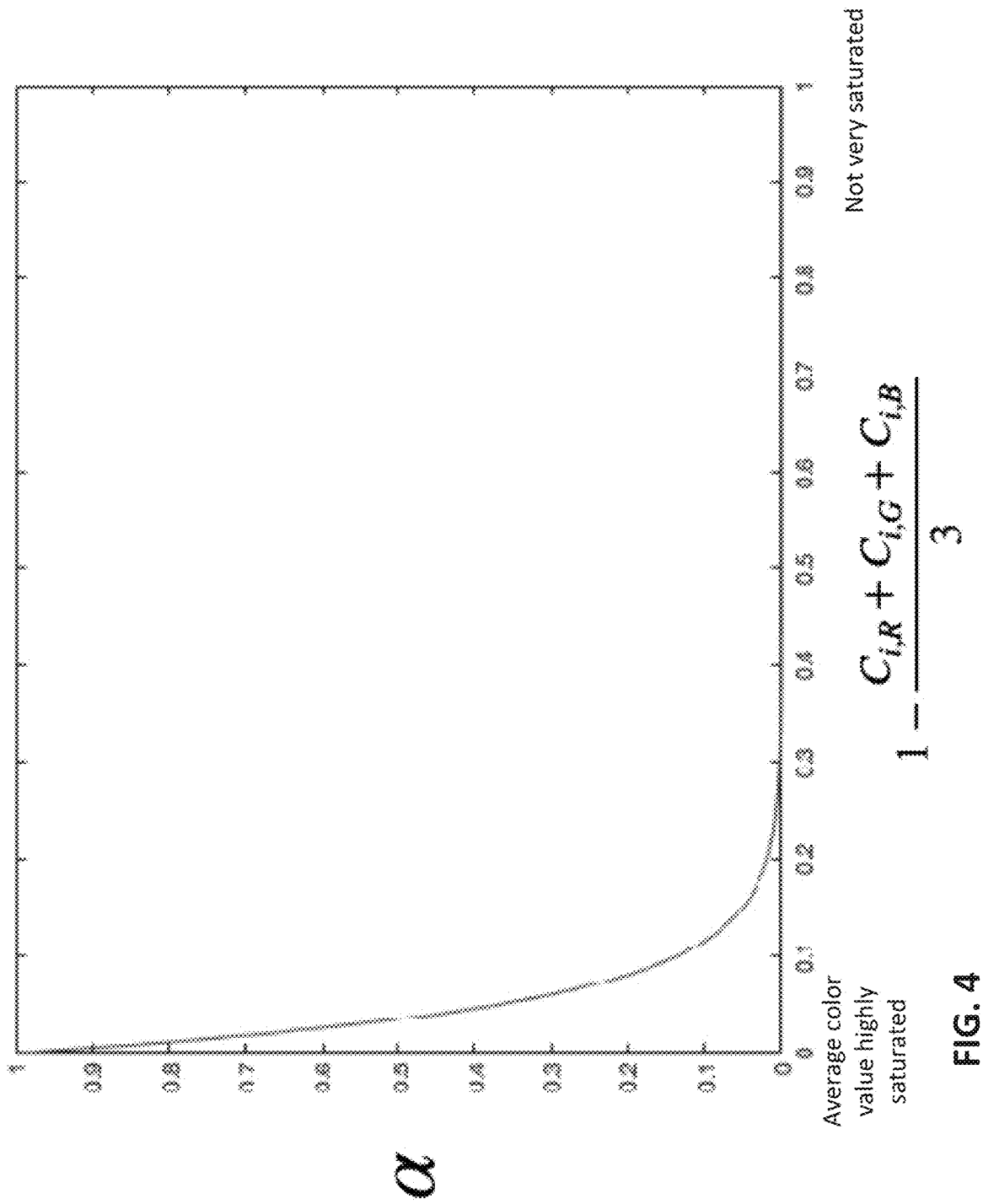
FIG. 4 depicts a graph showing an example plot of an interpolation coefficient that may be used for highlight recovery in accordance with various examples described herein.

FIG. 4 depicts a plot of $\alpha_i$ vs $$1 - \frac{C_{i,R} + C_{i,G} C_{i,B}}{3}$$

which is the distance of the average pixel color value (e.g., the average of the clipped, WB gained, and color corrected RGB color values) from clipping (saturation). As shown, as the average color value approaches saturation/clipping, the distance from saturation/clipping is small, and the interpolation coefficient $\alpha_i$ is higher. Conversely, as the average color value becomes smaller, the distance from saturation/clipping becomes larger, and the interpolation coefficient $\alpha_i$ becomes smaller.

Figure 5:
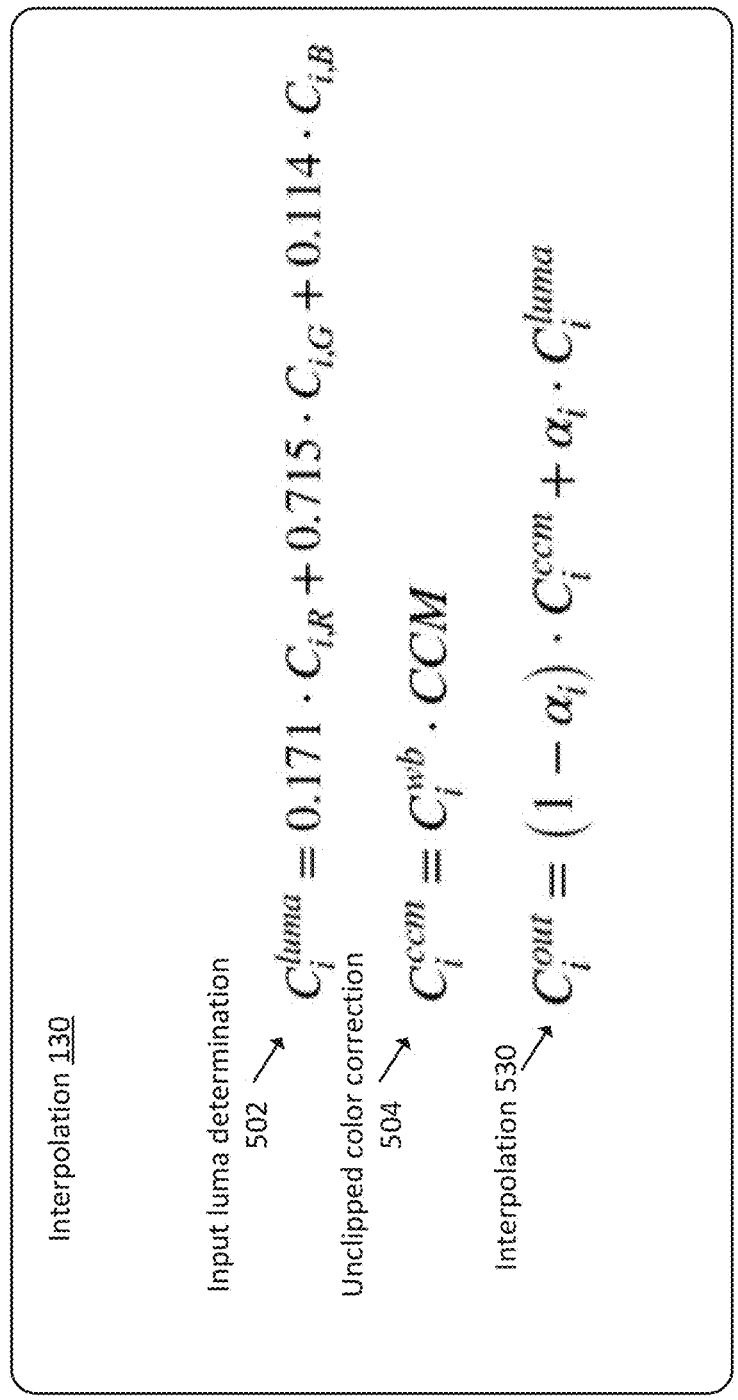
FIG. 5 depicts an example interpolation that may be used for highlight recovery in image data, in accordance with various aspects of the present disclosure.

FIG. 5 depicts an example interpolation 130 that may be used for highlight recovery in image data, in accordance with various aspects of the present disclosure. In general, interpolation 130 may interpolate between an unclipped representation of the input pixel (e.g., input pixel luma or white-balance gained, unclipped color values of the input pixel) and an unclipped representation of the white-balance gained, color corrected color values of the input pixel ($C_i^{ccm}$).

In various examples, the luma of the input pixel may be determined from the RGB values as shown in input luma determination 502 using $C_i^{luma} = 0.171 \cdot C_{i,R} + 0.715 \cdot C_{i,G} + 0.114 \cdot C_{i,B}$, a Rec. 709 luminance estimation technique. Rec. 709 is a standard developed for image encoding and signal characteristics of high-definition images. Various other techniques for determining luma from RGB data are known and may be used instead. The unclipped white-balance gained, color corrected color values of the input pixel ($C_i^{ccm}$) may be determined as shown in unclipped color correction 504 using $C_i^{ccm} = C_i^{wb} \cdot CCM$.

Interpolation 530 may be a linear interpolation between $C_i^{ccm}$ and $C_i^{luma}$ using the interpolation coefficient $\alpha_i$. For example, interpolation 530 may perform the linear interpolation $$C_i^{out} = (1 - \alpha_i) \cdot C_i^{ccm,unclipped} + \alpha_i \cdot C_i^{luma}.$$

As previously described, the interpolation coefficient $\alpha_i$ is determined using a clipped representation of the white-balance gained and color corrected pixel value. In various examples, after determining the clipped representation of the white-balance gained and color corrected pixel value ($C_{i,c}^{ccm,clipped}$), the corresponding interpolation coefficient $\alpha_i$ may be looked up in a look-up table (LUT). In general, the closer the average color value is to saturation/clipping the higher the interpolation coefficient $\alpha_i$ will be. Accordingly, as the average color value $C_{i,c}^{ccm,clipped}$ approaches saturation/clipping, the interpolation 530 weights the $C_i^{luma}$ more heavily. Conversely, as the further the average color value is from saturation/clipping the lower the interpolation coefficient $\alpha_i$ will be. Accordingly, as the average color value $C_{i,c}^{ccm,clipped}$ approaches 0, the interpolation 530 weights the unclipped color corrected value $C_i^{ccm}$ more heavily. The output pixel values generated using interpolation 530 result in highlight recovery and elimination of false colors resulting from negative values in the color correction matrix being applied to clipped values.

Note that although these techniques are particularly advantageous in RGB (IR) image sensors (where the IR row of the CCM is negative), these techniques are applicable to highlight recovery in RGB image sensors as well.

Figure 6A:
FIG. 6A is an example image that has been white balance gained and color corrected without the highlight recovery techniques described herein.
Figure 6B:
FIG. 6B depicts the example image of FIG. 6A after performing the highlight recovery techniques described herein.

FIG. 6A is an example image that has been white balance gained and color corrected without the highlight recovery techniques described herein. As shown in the encircled region false color 602 (magenta) has resulted from negative values in the CCM being applied to clipped white balanced values. FIG. 6B depicts the example image of FIG. 6A after performing the highlight recovery techniques described herein. As can be seen, the false color has been removed and color value highlights have been recovered in the highlights recovered 604 region.

Figure 7:
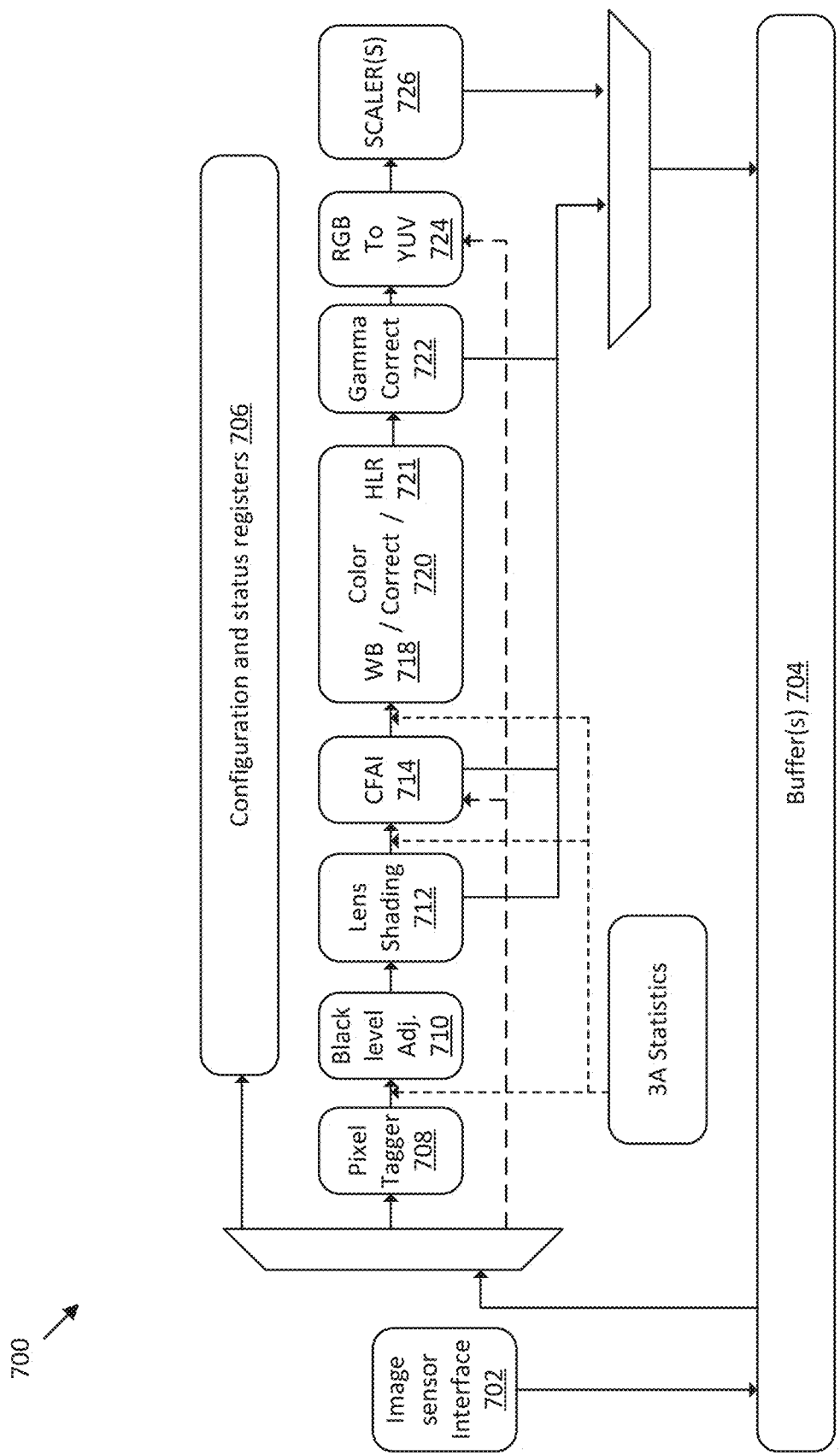
FIG. 7 is a block diagram of an example image signal processor architecture that may be used in accordance with various aspects of the present disclosure.

FIG. 7 is a block diagram of an example image signal processor architecture 700 that may be used in accordance with various aspects of the present disclosure. In some examples, an image signal processor may be implemented with a different architecture relative to the example image signal processor architecture 700 displayed in FIG. 7. For example, certain components may be omitted, additional components may be added, and/or some components may be substituted for other, different components, depending on the desired implementation.

The image signal processor architecture 700 (e.g., an image signal processor (ISP)) may include an image sensor interface 702 that receives image data from the image sensor (e.g., as filtered using the CFA). For example, the image sensor interface 702 may be a mobile industry processor interface ("MIPI") such as MIPI D-PHY or MIPI C-PHY. MIPI D-PHY is a physical layer that includes a clock-forwarded synchronous link providing low noise and high jitter tolerance. MIPI D-PHY uses one clock lane and a variable number of data lanes to receive the image data from the image sensor. MIPI C-PHY, by contrast, uses an embedded clock that is embedded into the data lane. In various examples, the image sensor interface 702 may bridge a MIPI controller interface data to a streaming interface (e.g., an AXI streamlining interface) that writes data to AXI memory.

Buffer(s) 704 may comprise one or more circular buffers that may be used for streamlining to/from AXI (or other streaming protocols). In various examples, inbound data streams may be managed by circular buffer readers and outbound data streams may be managed by circular buffer writers. The buffer(s) 704 may use circular buffer management addresses/pointers to map an AXI stream either to or from linear AXI memory. This streamlining to/from circular buffers provides data storage/capture/replay capability in static random access memory (SRAM).

Configuration and status registers 706 may store various configuration data such as, for example, CFA index values, pixel color values associated with different CFA index values (e.g., in a table), per-CFA index offset values, gain values, etc. As described below, various components of the image signal processor architecture 700 may reference configuration and/or status data stored by configuration and status registers 706 during operation.

Image data may be received via image sensor interface 702 as an inbound pixel stream (IPS) comprising raw pixel values generated by the image sensor. Pixel tagger 708 may include circuitry (e.g., an ASIC) that tags the IPS data with metadata representing a coordinate (e.g., an X, Y coordinate) corresponding to the location of the pixel on the image sensor and/or the corresponding frame of image data. In addition, the pixel tagger 708 may tag the pixel with metadata representing an index position of the CFA. The X, Y coordinates may be used to lookup the pixel color (e.g., to represent the pixel as a red, green, blue, or infrared pixel based on the type of filter found at the index of the CFA). In some cases, metadata representing the pixel color (red, green, blue, or IR) may also be used by pixel tagger 708 to tag the inbound IPS data.

For example, pixel tagger 708 may use the frame width (in terms of a number of pixels) and height (in terms of a number of pixels) to tag the incoming raw pixel value (IPS data) with an X-Y position within the frame. The X, Y coordinates may be used to lookup a pixel color in a 16 entry table (e.g., corresponding to the color filters of the CFA) to label each pixel value with pixel color metadata. Similarly, each pixel value may be labeled with a CFA index (e.g., 0-15) that corresponds to the pixel value.

After tagging the pixel values using the pixel tagger 708 (as described above), the pixel values may be provided to black level adjustment component 710. Black level adjustment component 710 may include circuitry (e.g., an ASIC) effective to subtract a fixed direct current (DC) offset value from the input pixel values to adjust the black level of the image data. The particular DC offset value may be specific to each CFA index. Accordingly, the CFA index value metadata generated by pixel tagger 708 may be used by black level adjustment component 710 to determine the appropriate DC offset value to subtract for each pixel.

In various examples, the image signal processor architecture 700 may include a lens compensation component (not shown). A lens compensation component may be used to add a signed per-CFA index offset to compensate for veiling glare resulting from a lens of the camera generating the image data. Further, in some examples, a lens compensation component may apply a common multiplier (uniform gain) to all pixels to boost the signal. Further, in some examples, the lens compensation component (and/or a separate component) may perform defective pixel correction (DPC). DPC may evaluate each pixel's raw pixel value against an expected range of pixel values that is estimated using nearby pixels (e.g., adjacent pixels and/or pixels within a predefined distance from the subject pixel). If the pixel's raw pixel value is out of range the pixel may be deemed "defective" and the raw pixel value may be replaced by a pixel value that is estimated using nearby pixels of the same pixel color.

The pixel data may be sent to the lens shading component 712. In some examples, the lens shading component 712 may be combined with a lens compensation component. However, in other implementations, these components may be implemented using separate circuits and/or modules. Lens shading component 712 may compensate for lens and camera defects and/or tolerances, as well as lens edge transmission characteristics by applying a per-pixel color gain based on the X, Y position of the pixel in the frame. In various examples, the lens shading component 712 may lookup the per-pixel color gain using the X, Y position metadata of the pixel (added by pixel tagger 708) in a table stored in configuration and status registers 706. In various examples, the per-pixel color gain may also be determined using the metadata indicating the pixel's color. The gain may be multiplicatively applied to the pixel using a multiplier circuit of the lens shading component 712 in order to account for lens properties and manufacturing tolerances. In various implementations, the per-pixel color gain may be determined using the pixel's X, Y position metadata to identify a lens-shading cell of a grid. The corners of the cell may define the four corner grid points. Each corner grid point may be associated with a respective lens shading gain for the pixel's pixel color. The four lens shading gains may be interpolated to determine the gain to be applied to the pixel.

After lens shading component 712, the modified pixel data (e.g., the modified raw pixel values and the various metadata tagging each pixel described above) may be sent to CFA interpolation (CFAI) component 714. CFAI component 714 may perform CFA interpolation (demosaicing) to generate $I_{R,G,B,IR}$ image data for the current frame of image data so that each pixel is associated with a red pixel value, a green pixel value, a blue pixel value, and an infrared pixel value (in the case of an RGB (IR) image sensor).

Figure 8:
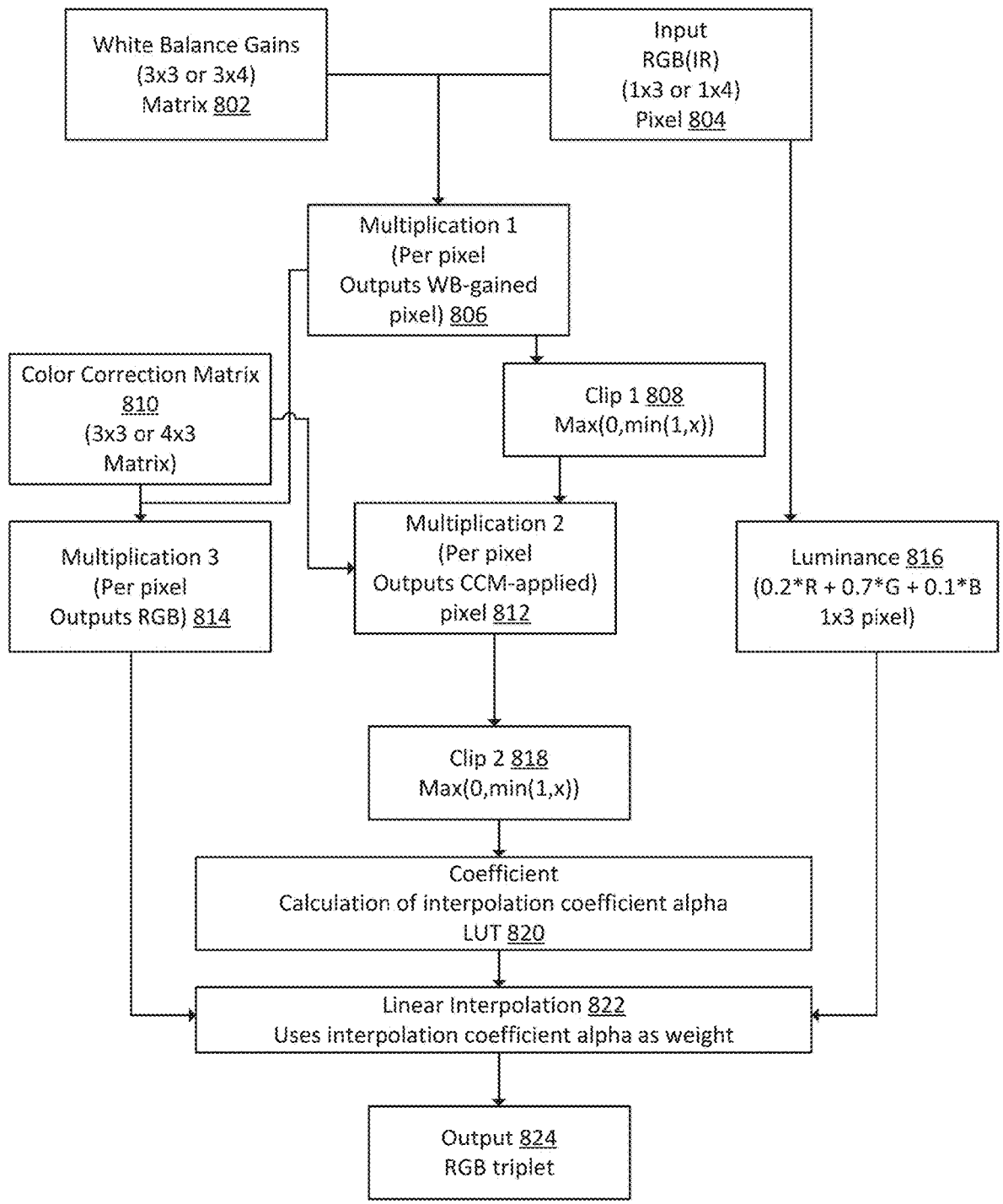
FIG. 8 is an example block diagram depicting various hardware and operations that may be used to perform one or more of the highlight recovery techniques described herein, in accordance with various aspects of the present disclosure.

As shown in FIG. 7, white balance component 718, color correction component 720, and HLR component 721 may be implemented as a single component in hardware (e.g., as a single integrated circuit, as described in reference to FIG. 8). In some other examples, HLR component 721 may apply white balance gains and/or the CCM (e.g., as described in FIG. 8), while conventional white balance and/or color correction components may be placed in a bypass mode in hardware.

White balance component 718 may apply a per-CFA index multiplier (e.g., determined using a lookup table for each CFA index) as a gain to each pixel value. In various examples, white balancing and/or gamma correction (e.g., performed by gamma correction component 722) may be implemented by the same component (e.g., ASIC) as the color correction component 720.

As previously described, red, green, and blue pixel values may be modified based on the infrared information using a 4×3 color correction matrix of color correction component 720. However, in some other implementations, the fully de-mosaiced image output by CFAI component 714 may have IR removed by an IR removal component (not shown in FIG. 7). Red, Green, Blue, and IR pixels have similar infrared responses in terms of spectral sensitivity. Accordingly, it is possible to use IR pixels as a reference to subtract off IR from the R, G, B pixels to remove IR information. Accordingly, an optional IR removal component may subtract the IR pixel values as a reference to remove infrared values from the image data.

In some cases, visible light pixels (R, G, B pixels) may be saturated when IR pixels are not saturated. In such a case, subtraction of an unsaturated IR value from a saturated R, G, B pixel may result in overcompensation which produces some unnatural results (e.g., dark skies and/or black suns in outdoor images). Accordingly, in various examples, the optional IR removal component may perform a 3×3 matrix multiplication on R, G, B color pixels if such pixels are unsaturated. If pixels (and particularly green pixels which have higher and broader spectral response) are saturated, the IR component may be corrected using a secondary clip operation. Optimal clip values may be determined using statistics gathered from prior frames by analyzing regions of green pixels that are saturated.

Color correction component 720 may be a circuit (e.g., a color correction circuit) effective to apply a color correction matrix (CCM) to the color planes to correct the color space. For example, if IR is first removed the CCM may be:

$$\text{Pixel}[R\ G\ B] = \begin{bmatrix} KR_R & KB_B & KG_G \\ KB_R & KB_B & KB_G \\ KG_R & KG_B & KG_G \end{bmatrix} \cdot \begin{bmatrix} R \\ B \\ G \end{bmatrix}$$

However, in other examples, IR information may be treated as another dimension of the image and not as a contaminant to the image. Such examples may not use an IR removal component, but may instead use a 4×3 matrix operation that takes 4 channels at input (R, G, B, and IR) and outputs 3 channels (R, G, B) eliminating the IR removal component. In such examples, the CCM may be a 4×3 matrix. Color correction component 720 may be implemented as a matrix multiplication circuit.

HLR component 721 may use the highlight recovery techniques described herein to interpolate between the unclipped and white balance gained pixel values and pixel value luma depending on how close to saturation the average pixel color values are, as described in detail above. The various techniques used by HLR component 721 are not repeated in reference to FIG. 7 for brevity. However, and example hardware implementation of HLR component 721 is shown and described in reference to FIG. 8.

The CCM and white balance gains may be determined using statistics related to calibration of the image sensor. Such calibration statistics may include Auto-white balance statistics, auto-exposure statistics, and auto-focus statistics. Collectively, these statistics are often referred to as "3A statistics." The 3A statistics may be stored in memory (e.g., in configuration and status registers 706) and may be used to determine the white balance gains and/or the CCM as described below in reference to FIG. 12. Accordingly, the 3A statistics may be provided at various points in the image signal processing pipeline prior to WB component 718 and color correction component 720, as shown in FIG. 7. Additionally, in various examples, the interpolation coefficient $\alpha_i$ may be calculated in advance for various combinations of color pixel values (e.g., RGB values) and may be stored in a lookup table so that HLR component 721 may lookup the interpolation coefficient $\alpha_i$ in order to determine the highlight recovered pixel values.

Gamma correction component 722 is used to correct for the differences between the way the image sensor captures information and the way that the human visual system processes light. In the image signal processor architecture 700 gamma correction may be performed using a lookup for each channel (e.g., R, G, and B) of each pixel to adjust the contrast of the image. Each color (R, G, B) may be associated with an independent gamma table that is used to lookup a gamma corrected value. In various examples, the lookup tables may be indexed by the pixel color value. The lookup tables may store the gamma corrected pixel values.

RGB to YUV component 724 may transform the RGB format data to the YUV format. In various examples, RGB to YUV component 724 may employ a 3×3 matrix multiplication followed by addition of an offset. For example:

$$Y = [R\ G\ B]\begin{bmatrix} Y_R \\ Y_G \\ Y_B \end{bmatrix} + Y_{\text{offset}};$$

$$U = [R\ G\ B]\begin{bmatrix} U_R \\ U_G \\ U_B \end{bmatrix} + U_{\text{offset}};$$

$$V = [R\ G\ B]\begin{bmatrix} V_R \\ V_G \\ V_B \end{bmatrix} + V_{\text{offset}}.$$

In various examples, the YUV format may require less bandwidth for transmission and/or storage.

Scaler 726 may be used to upscale or downscale the YUV (or RGB) data prior to converting the image data into a bit stream for writing to buffer(s) 704 (e.g., a circular buffer). In various examples, each of the luma (Y) and chroma (UV) channels may have separate configurations, to allow them to each be scaled independently. This may be important when converting from YUV444 to YUV420, as chroma is scaled to be ¼ the resolution (½ in each of the X, Y directions) of luma. Scaler 726 also provides cropping functionality such that the field of the output frame is a subset of the field of the input frame.

The scaler 726 first comprises a decimator followed by a filter. The decimator can be used to reduce the image size by 4:1, 3:1, 2:1, leave the image size unchanged, and/or change the image size by some other ratio, depending on the implementation. The image size may be changed independently in each of the horizontal (H) and vertical (V) directions.

In some examples, the decimator can be programmed to drop input pixels at the left, right, top, and bottom edges of the input image, providing for some cropping capability. Further cropping capability may be provided by the scaling function, with the added benefit of possibly more desirable edge interpolation, as the post-decimation image would not need to be edge extrapolated.

After the decimator stage, the input pixels define an annotated grid of locations, with columns (COLS) and rows (ROWS) (where COLS and ROWS is the post-decimator frame size). The scaler 726 uses the calibrated input grid and a set of configuration registers that are used to determine from where in the calibrated input grid each output pixel should be interpolated/extrapolated. The input pixels are defined to exist in the middle of each cell in the grid, thus the first input pixel is at 0.5, 0.5 in the defined grid.

Figure 9:
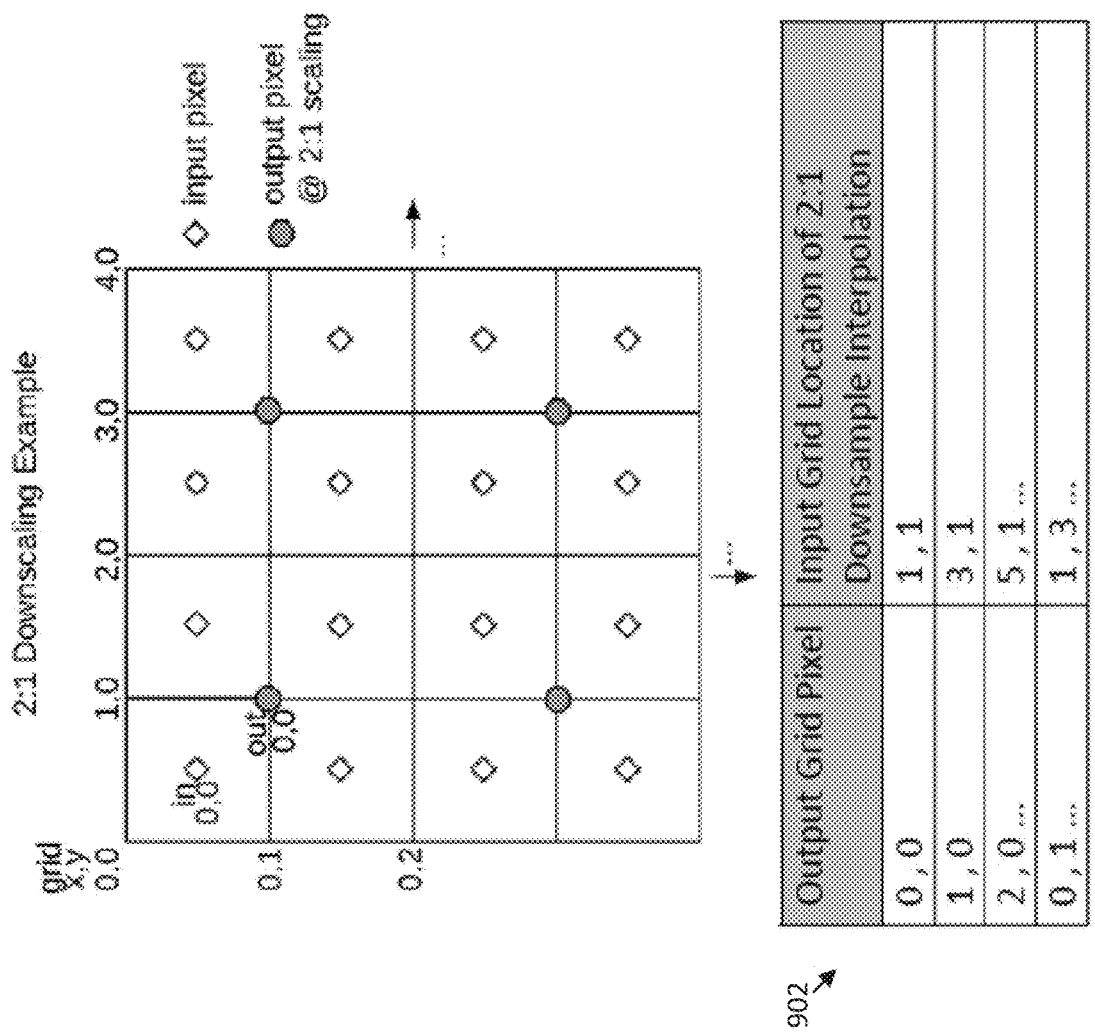
FIG. 9 is an example of image downscaling that may be performed in accordance with various aspects of the present disclosure.

FIG. 9 is a 2:1 example of image downscaling that may be performed in accordance with various aspects of the present disclosure. For example, to downscale from 640× 480 to 320×240 is a 2:1 downscale, and the input grid is 640 COLS and 480 ROWS of grid cells, but the grid points are 0,0 to 641,481. The output pixel at 0,0 of the output grid is interpolated from location 0.5,0.5 in the input grid. Other output pixels are interpolated as shown in table 902 of FIG. 9.

To accomplish this, the scaler 726 uses, for each direction, a configured "initial" position value (Init) and position "increment" value (Incr) in order to specify where the output pixels are interpolated from within the input pixel frame grid. In the current example, Init=1 and Incr=2, so that the output pixels will have 2× the spacing of the input pixels, effectively a 2:1 downscale.

In each direction, the scaler 726 maintains a position register to indicate the position on the input grid from which to interpolate the output pixel. This position starts with the Init value, and is advanced by the amount of the Incr value after each output pixel is generated in that direction.

Thus, for the horizontal direction, output_pixel[0] is generated at grid position Init, output_pixel[1] is generated at grid position Init+Incr, . . . and output_pixel[N] is generated at grid position Init+N*Incr.

It should be noted that the RGB to YUV conversion by RGB to YUV component 724 and/or the up-scaling or down-scaling by scaler 726 may be optional operations that may not be performed in all cases. Output streams (e.g., frames of image data processing using the various components described above in reference to FIG. 7) may be sent to one or more buffers of the AXI (or other streaming protocol) memory.

FIG. 8 is an example block diagram depicting various hardware and operations that may be used to perform one or more of the highlight recovery techniques described herein, in accordance with various aspects of the present disclosure. In various examples, the various components displayed in FIG. 8 may be components of HLR component 721 (and/or RGB (IR) highlight recovery 118) that may be used to modify pixel values. FIG. 8 also describes operations/components of the white balance component 718 and color correction component 720.

In various examples, white balance gains (e.g., a 3×3 matrix (for a Bayer RGB image sensor) or a 3×4 matrix for an RGB (IR) image sensor)) may be determined (e.g., using a lookup table based on the CFA index and the 3A statistics). The input RGB/RGB (IR) pixel 804 (e.g., a 1×3 or 1×4 matrix depending on the image sensor used) may be received from CFAI component 714. The input RGB (IR) pixel 804 may be white balance gained by multiplying the white balance gains matrix 802 by the input RGB (IR) pixel 804 using multiplication 1 circuit 806. This operation may be performed for each pixel as each pixel may have different white balance gains and different pixel values. The color correction matrix (CCM) 810 may be looked up in memory for the pixel and may be multiplied by the output WB-gained pixel (unclipped) using multiplication 3 circuit 814 to output an 1×3 RGB pixel. This unclipped, white balance gained, color-corrected pixel (e.g., ccc ccm,unclipped) may be one of the inputs to linear interpolation circuit 822 of HLR component 721.

Additionally, the white balance gained pixel output by multiplication 1 circuit 806 may be clipped by clipping circuit 808 to limit RGB (IR) values above 1 to 1 and to limit values below 0 to 0. Accordingly, clipping circuit 808 outputs a clipped, white balance-gained pixel $C_{i,c}^{wb,clipped}$ (a 1×4 RGB-IR pixel). The CCM 810 (e.g., a 4×3 CCM matrix) may be multiplied by the clipped, white balance-gained pixel using multiplication 2 circuit 812 to generate a color corrected RGB representation of the clipped, white balance-gained pixel ($C_i^{ccm}$). The white balance gained, color-corrected pixel may be clipped by clipping circuit 818 to limit RGB values above 1 to 1 and to limit values below 0 to 0 to generate a clipped, white balance-gained and color-corrected RGB pixel (e.g., $C_i^{ccm,clipped}$). This value ($C_i^{ccm,clipped}$) may be used to lookup the interpolation coefficient $\alpha_i$ in a lookup table 820. The interpolation coefficient at may be another input to the linear interpolation circuit 822.

The other input to the linear interpolation circuit 822 is an unclipped representation of the input pixel (after CFA interpolation). For example, in one implementation, luminance of the input pixel may be determined (e.g., using an adder/multiplier circuit) such as luminance determination circuit 816 which may determine a luminance of the pixel using a weighted sum of the R, G, B component values (as shown). However, in another example implementation, instead of using input pixel luma, the unclipped, white balance-gained input pixel may be multiplied by an identity CCM to generate the unclipped representation of the input pixel which may serve as the third input to the linear interpolation circuit 822.

The linear interpolation circuit 822 may be an adder/multiplier circuit configured to implement $C_i^{out}=(1-\alpha_i)\cdot C_i^{ccm,unclipped}+\alpha_i\cdot C_i^{luma}$. Although, as previously described, instead of using $C_i^{luma}$, interpolation may instead occur between $C_i^{ccm,unclipped}$ and an unclipped, white balance-gained input pixel that has been reduced to 3 dimensions using a 4×3 identity CCM matrix. The linear interpolation circuit 822 may perform the linear interpolation operation for each channel (e.g., R, G, and B) of the input pixel where the luma value $C_i^{luma}$ may be identical for each channel. If the unclipped, white balance-gained input pixel multiplied by the identity CCM is used instead of luma, the interpolation may occur for each of the RGB color channels. The resulting output RGB pixel 824 may reduce and/or eliminate false colors and provide highlight recovery, as previously described.

Figure 10:
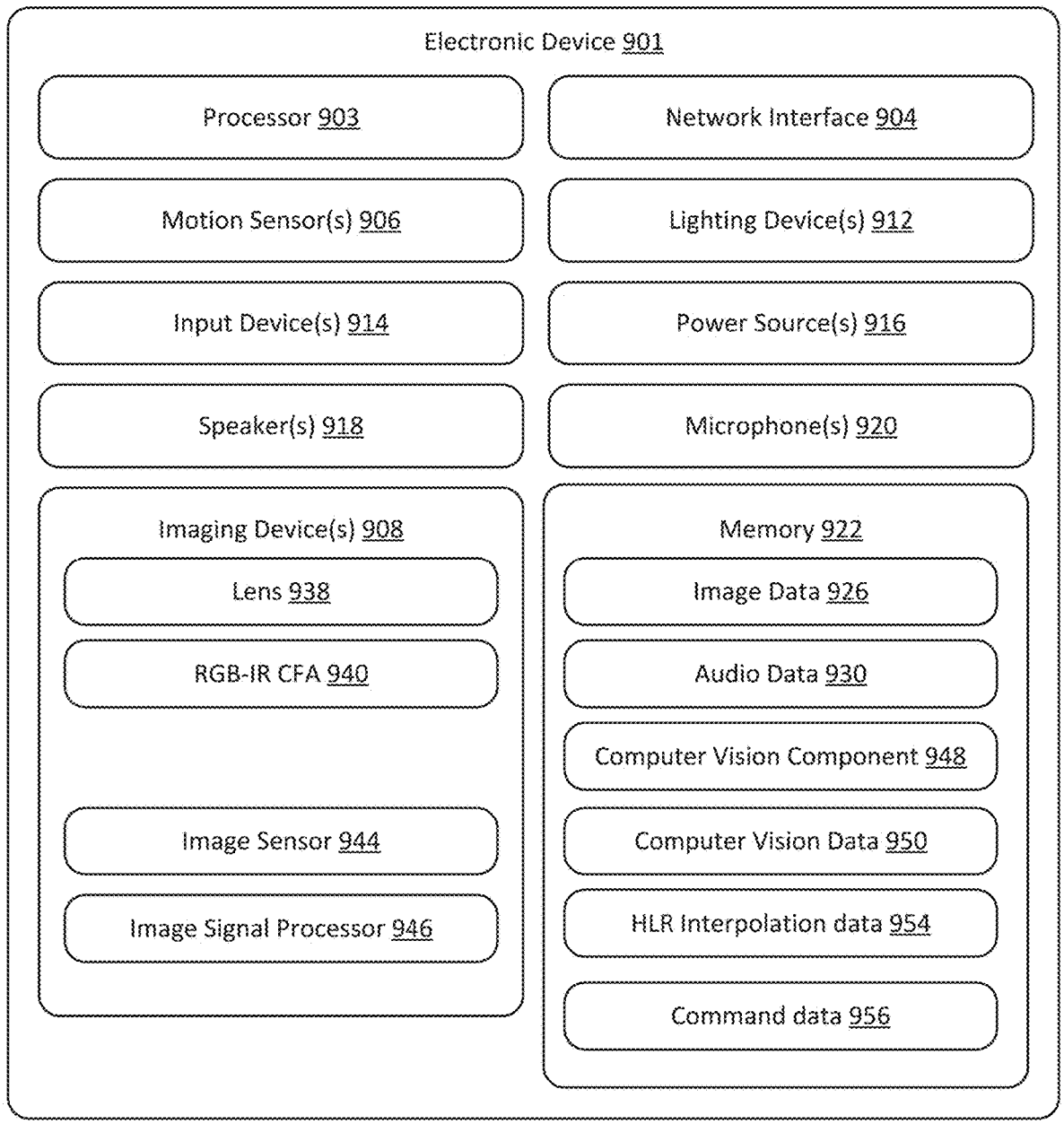
FIG. 10 is a block diagram showing an example architecture of a computing device that may be used in accordance with various aspects of the present disclosure.

FIG. 10 illustrates an example architecture of the electronic device 901. As shown, the electronic device 901 may include one or more processors 903, one or more network interfaces 904, one or more motion sensors 906, one or more imaging devices 908, one or more lighting devices 912, one or more input devices 914, one or more power sources 916, one or more speakers 918, one or more microphones 920, and memory 922.

The motion sensor(s) 906 may be any type of sensor capable of detecting and communicating the presence of an object within their field of view. As such, the motion sensor(s) 906 may include one or more (alone or in combination) different types of motion sensors. For example, in some embodiments, the motion sensor(s) 906 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 903, for example, to one or more threshold voltage values to determine if the amount of voltage in the output signal is indicative of motion, and/or if the amount of voltage in the output signal is indicative of motion of an object that is to be captured by the imaging device(s) 908. In some examples, the processor(s) 903 may determine the distance based on the amount of voltage in the output signal. Additionally, or alternatively, in some examples, the processor(s) 903 may determine the distance based on which motion sensor 906 detected the object.

Although the above discussion of the motion sensor(s) 906 primarily relates to PIR sensors, depending on the example, the motion sensor(s) 906 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 906.

An imaging device 908 may include any device that includes an image sensor 944, such as a charge-coupled device (CCD) and/or an active-pixel sensor (CMOS sensor), that is capable of generating image data 926 (which may represent, and/or include, the frames of image data described herein), representing one or more images (e.g., a video). The imaging device 908 may include a lens 938 that is effective to focus light on the image sensor 944. As previously described, the light may be filtered by an RGB-IR CFA 940. In one aspect of the present disclosure, the image sensor 944 may comprise a complementary metal-oxide semiconductor (CMOS) array and may be capable of recording high definition (e.g., 722p, 1800p, 4K, 8K, etc.) image and/or video files. The image sensor 944 may comprise a plurality of photosensors that may transform light into electrical signals. Such electrical signals may be represented by numerical values (e.g., floating point numbers) that may be processed using the image signal processor 946. Each photosensor of the image sensor 944 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

In some other examples, the image sensor may be coated with a dual band-pass filter that has a passband at about 900 nm to allow IR color reproduction during the day and also to allow IR light detection when the imaging device(s) 908 are in night mode. The imaging device 908 may include a separate image signal process 946 (e.g., including image signal processor architecture 700 or some other desired architecture), or the processor(s) 903 may perform the camera processing functionality. The processor(s) 903 (and/or camera processor) may include an encoding and compression chip. In some embodiments, the processor(s) 903 (and/or the camera processor) may comprise a bridge processor. The processor(s) 903 (and/or the camera processor) may process video recorded by the image sensor and may transform this data into a form suitable for transfer by the network interface(s) 904. In various examples, the imaging device 908 also includes memory, such as volatile memory that may be used when data is being buffered or encoded by the processor(s) 903 (and/or the camera processor). For example, in certain embodiments the camera memory may comprise synchronous dynamic random-access memory (SD RAM).

The lighting device(s) 912 may be one or more light-emitting diodes capable of producing visible light and/or infrared light when supplied with power (e.g., to enable night vision). In some embodiments, when activated, the lighting device(s) 912 illuminates a light pipe. In some examples, the electronic device 901 uses the lighting device(s) 914 to illuminate specific components of the electronic device 901, such as the input device(s) 914. This way, users are able to easily see the components when proximate to the electronic device 901.

An input device 914 may include, but is not limited to, a button, a touch-sensitive surface, a switch, a slider, and/or any other type of device that allows a user to provide input to the electronic device 901. For example, if the electronic device 901 includes a doorbell, then the input device 914 may include a doorbell button. In some examples, based on receiving an input, the processor(s) 903 may receive a signal from the input device 914 and use the signal to determine that the input device 914 received the input. Additionally, the processor(s) 903 may generate input data representing the input received by the input device(s) 914. For example, the input data may represent the type of input (e.g., a push to a button), a time that the input occurred, and/or the like.

The power source(s) 916 may include one or more batteries that provide power to the electronic device 901. However, in other examples, the electronic device 901 may not include the power source(s) 916. In such examples, the electronic device 901 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 918 may be any electromechanical device capable of producing sound in response to an electrical signal input. The microphone(s) 920 may be an acoustic-to-electric transducer or sensor capable of converting sound waves into audio data 930 representing the sound. The speaker(s) 918 and/or microphone(s) 920 may be coupled to an audio CODEC to enable digital audio received by user devices to be decompressed and output by the speaker(s) 918 and/or to enable audio data captured by the microphone(s) 920 to be compressed into digital audio data 930. In some examples, the electronic device 901 includes the speaker(s) 918 and/or the microphone(s) 920 so that the user associated with the electronic device 901 can communicate with one or more other users located proximate to the electronic device 901. For example, the microphone(s) 920 may be used to generate audio data representing the speech of the one or more other users, which is then sent to the camera device 108. Additionally, the speaker(s) 918 may be configured to output user speech of the user, where the user's user speech may also be represented by audio data 930.

In some examples, the electronic device 901 determines that the start of the video is the first frame of the video. In some examples, such as when the electronic device 901 continuously generates the image data 926 (e.g., the electronic device 901 does not turn off the imaging device(s) 908), the start of the video corresponds to the portion of the video that the imaging device(s) 908 were generating right after detecting an event. For example, the start of the video may correspond to the first frame of the video after detecting the event. In other examples, such as when the electronic device 901 does not continuously generate the image data 926 (e.g., the electronic device 901 turns off the imaging device(s) 908 until detecting an event such as a motion event), the start of the video corresponds to the first frame of the video that is generated by the imaging device(s) 908.

As further illustrated in the example of FIG. 10, the electronic device 901 may include the computer-vision component 948. The computer-vision component 948 may be configured to analyze the image data 926 using one or more computer-vision techniques and output computer-vision data 950 based on the analysis. The computer-vision data 950 may represent information, such as the presence of an object represented by the image data 926, the type of object represented by the image data 926, locations of the object relative to the electronic device 901, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 950 may further represent a bounding box indicating the respective location of each object represented by the image data 926.

For example, the computer-vision component 948 may analyze the image data 926 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 948 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video.

Clustering technique(s) may partition an image into a number of clusters (e.g., portions). For instance, the clustering technique(s) may pick a number of cluster centers, either randomly or based on some heuristic method. The clustering technique(s) may then assign each pixel in the image to the cluster that minimizes the distance between the pixel and the cluster center. Next, the clustering technique(s) may re-compute the cluster centers by averaging all of the pixels in the cluster. These steps may be repeated until a convergence is attained, which is when no pixel changes clusters.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 948 may use object detection technique(s) that use computer-vision analysis to perform informative region selection, features extraction, and then classification of object(s) represented by the image data 926. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

The electronic device 901 may also store command data 956. In some circumstances, a user of the electronic device 901 may want to receive a live view from the electronic device 901. The command data 956 may represent an identifier associated with the electronic device 901, a command to generate the image data 926, a command to send the image data 926, and/or the like. In some examples, the electronic device 901 may then analyze the command data 956 and, based on the identifier, determine that the command data 956 is directed to the electronic device 901. For example, the electronic device 901 may match the identifier represented by the command data 956 to an identifier associated with, and stored by, the electronic device 901. Additionally, the electronic device 901 may cause the imaging device(s) 908 to begin generating the image data 926 (e.g., if the imaging device(s) 908 are not already generating the image data 926) and send the image data 926 to the one or more computing devices 102, the camera device 108, and/or another device.

Electronic device 901 may also store HLR data 954 effective to cause processor 903 and/or image signal processor 946 to perform techniques associated with RGB (IR) highlight recovery 118. As described above, RGB (IR)

highlight recovery 118 may be used to interpolate between representations of the unclipped input pixel based on the distance to saturation in the color space. The logic and/or circuitry used to implement the RGB (IR) highlight recovery 118 may be implemented in the image signal processor 946 (e.g., as described above in reference to FIGS. 7-8, for example). It should be noted that the HLR techniques described herein may be used in RGB image sensors that lack infrared sensitivity as well. The HLR data 954 may include a lookup table that may be used to look up the interpolation coefficient at.

In various other examples, the HLR data 954 may be used to implement the RGB (IR) highlight recovery 118 as software executing on the image signal processor 946 and/or as some combination of software executing on the image signal processor 946 and hardware included in the circuitry of the image signal processor 946 or one or more different components. Similarly, the HLR data 954 may be used to implement RGB (IR) highlight recovery 118 as software executing on processor 903 and/or as some combination of hardware and software executing on processor 903. In addition some operations and/or components of RGB (IR) highlight recovery 118 may be implemented by processor 903 (as hardware, software, and/or some combination thereof), while other operations and/or components of RGB (IR) highlight recovery 118 may be implemented by image signal processor 946 (as hardware, software, and/or some combination thereof). The executable instructions associated with HLR data 954, may be stored in memory 922 and/or in one or more separate memories, depending on the desired implementation.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Figure 11:
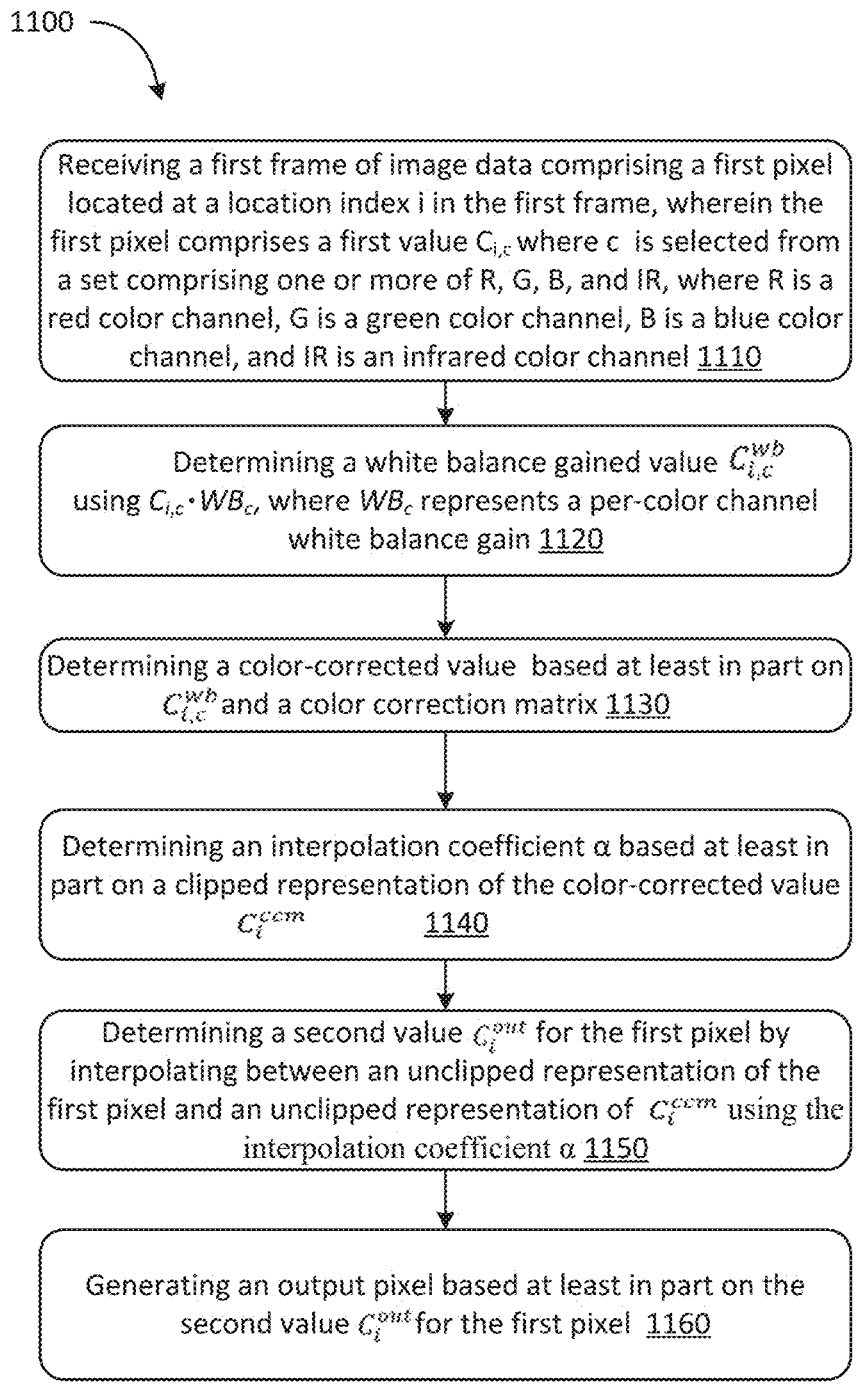
FIG. 11 is a flow diagram illustrating an example process for performing highlight recovery, in accordance with various aspects of the present disclosure.

FIG. 11 is a flow diagram illustrating an example process 1100 for performing highlight recovery, in accordance with various aspects of the present disclosure. The process 1100 of FIG. 11 may be executed by white balance component 718, color correction component 720, and/or highlight recovery component 721, among other potential components. The actions of process 1100 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 1100 may be described above with reference to elements of FIGS. 1-10.

Processing may begin at action 1110, at which a first frame of image data comprising a first pixel located at a location index i in the first frame may be received. The first pixel may include a first value $C_{i,c}$ where c is selected from a set comprising one or more of R, G, B, and IR values (with the IR value being optional, depending on the type of image sensor being used), where R represents a red color channel value for the first pixel, (represents a green color channel value for the first pixel, B represents a blue color channel value for the first pixel, and IR represents an infrared color channel value for the first pixel. Accordingly, the first pixel may comprise a red value, a green value, a blue value, and an infrared value. In the case where an RGB image sensor is used, the first value $C_{i,c}$ may instead include a red value, a green value, and a blue value without an infrared value. The first frame may be image data received from CFAI component 714.

Processing may continue at action 1120, at which a white balance-gained value $C_{i,c}^{wb}$ may be determined using $C_{i,c} \cdot WB_c$, where $WB_c$ represents a per-color channel white balance gain. The per-color channel white balance gain $WB_c$ may be determined per pixel index i using a lookup table (e.g., as described below in reference to FIG. 12). The product of the pixel data (e.g., a 1×4 matrix) and the white balance gains (e.g., a 1×4 matrix) may be determined as the white balance-gained value $C_{i,c}^{wb}$. In some examples, the unclipped white balance-gained value $C_{i,c}^{wb}$ may be color corrected using CCM to determine an unclipped representation of the input pixel for interpolation. In addition, to find the interpolation coefficient $\alpha_i$, the white balance-gained value $C_{i,c}^{wb}$ may be clipped using to limit the per-color channel values to between 0 and 1. As described above, the clipped white balance-gained value $C_{i,c}^{wb,clipped}$ may be color corrected, clipped again, and used to lookup the interpolation coefficient $\alpha_i$ for highlight recovery.

Processing may continue at action 1130, at which a color-corrected value $C_i^{ccm}$ may be determined based at least in part on $C_{i,c}^{wb}$ and a color correction matrix. As previously described, to determine the interpolation coefficient $\alpha_i$ the white balance-gained value $C_{i,c}^{wb}$ may be clipped prior to color correction. The color corrected and white balance-gained value $C_i^{ccm}$ may thereafter be clipped to values between 0 and 1 and the clipped color corrected and white balance-gained value $C_i^{ccm,clipped}$ may be used to lookup the interpolation coefficient $\alpha_i$. However, in order to determine the unclipped representation of the input pixel for interpolation, the unclipped representation of the white balance-gained value ($C_{i,c}^{wb,unclipped}$) may be color corrected (to generate $C_i^{ccm,unclipped}$).

Processing may continue at action 1140, at which the interpolation coefficient $\alpha$ based at least in part on a clipped representation of the color-corrected value $C_i^{ccm}$. As previously described, $C_i^{ccm,clipped}$ (e.g., the white balance-gained, color corrected, and clipped representation of the pixel) may be used to lookup the interpolation coefficient $\alpha_i$. The interpolation coefficient $\alpha_i$ may be calculated using, for example, the interpolation coefficient calculation 320. However, in some cases, a linear interpolation coefficient (and/or a piecewise function) may be used instead of the exponential expression for at depicted in FIGS. 3-4.

Processing may continue at action 1150, at which a second value $C_i^{out}$ for the first pixel may be determined by interpolating between an unclipped representation of the first pixel and an unclipped representation of $C_i^{ccm}$ using the interpolation coefficient $\alpha_i$. The unclipped representation of $C_i^{ccm}$ may be a white balance-gained and color corrected representation of the first pixel that is not clipped using a clipping operation. The unclipped representation of the first pixel may be $C_i^{luma}$ or may be a white balance-gained representation of the first pixel that is color corrected using an identity color correction matrix. The interpolation coefficient $\alpha_i$ may be used to weight the unclipped representation of $C_i^{ccm}$ and the unclipped representation of the first pixel (e.g., $C_i^{luma}$). As previously described, the closer the average pixel color ($C_{i,R}+C_{i,G}+C_{i,B}/3$) is to saturation, the more the interpolation coefficient $\alpha_i$ weights the unclipped representation of the first pixel (e.g., $C_i^{luma}$). As previously described, the interpolation operation may recover highlights lost (and avoid false colors) due to applying a CCM with negative values to values that are clipped/saturated after white balancing.

Processing may continue at action 1160, at which an output pixel may be determined based at least in part on the second value $C_i^{out}$ for the first pixel. For example, various operations may be performed on the pixel downstream of highlight recovery 118. For example, gamma correction, RGB to YUV conversion, scaling, etc., may be applied to the output to generate the output pixel that may be rendered on a display and/or sent to another device (in compressed or uncompressed form).

Figure 12:
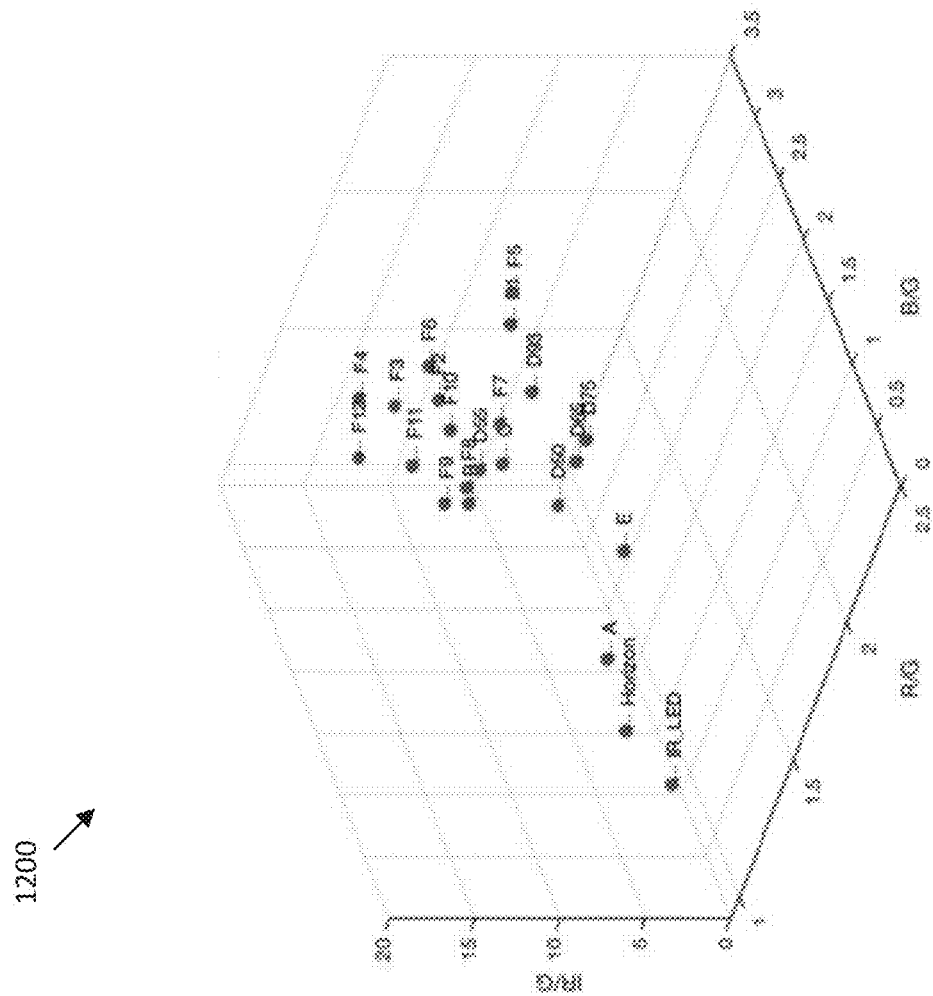
FIG. 12 is a three dimensional graph illustrating automatic white balance and color correction matrix determination for image data, in accordance with various aspects of the present disclosure.

FIG. 12 is a three dimensional graph illustrating automatic white balance and color correction matrix determination for image data, in accordance with various aspects of the present disclosure. Auto-white balance ("AWB") may initially down-sample the input image data (e.g., to a 16×16 pixel frame or some other suitable frame size). The down-sampling may be performed for each color channel separately. Accordingly, following the down-sampling there may be four 16×16 pixel frames (or some other suitable size), one frame for each color channel. Additionally, a frame that denotes saturated pixel regions may be generated (often referred to as a "saturation map"). Accordingly, AWB statistics may be of 5×16×16 size (where 5=4 color channels (R, G, B, IR)+1 saturation map). AWB uses the pixel statistics from non-saturated regions in the image to estimate the illuminant present in the scene. Illuminant can be identified using R/G, B/G, and IR/G channel ratios. Using these estimated ratios, the AWB algorithm finds the closest (e.g., the two or three closest) reference points from the image sensor calibration data.

As shown in the 3D graph 1200 in FIG. 12, the axes represent the R/G, B/G, and IR/G ratios. Each point in the 3D graph 1200 represents a pair of white balance gains (e.g., a 1×4 vector with gains for each channel (R, G, B, IR)) and a CCM matrix (e.g., a 4×3 matrix as described above in reference to FIG. 7 and color correction component 720). The final white balance gains to be used by white balance component 718 and CCM to be used by color correction component 720 may be determined by interpolating between the two or three closest reference points in the 3D graph 1200.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
  receiving a first frame of image data representing a plurality of pixels arranged in a grid, wherein a first pixel of the plurality of pixels is associated with an input red pixel value $C_R$, an input green pixel value $C_G$, an input blue pixel value $C_B$, and an input infrared pixel value $C_{IR}$;
  determining a white-balanced red pixel value $C_R^{wb}$ for the first pixel by multiplying the input red pixel value $C_R$ by a white balance gain corresponding to a red channel $WB_R$;
  determining a clipped, white-balanced red pixel value $C_R^{wb,clipped}$ by replacing white-balanced pixel values of $C_R^{wb}$ greater than 1 with a value of 1 and replacing white-balanced pixel values of $C_R^{wb}$ less than 0 with a value of 0;
  determining a color-corrected red pixel value $C_R^{ccm}$, a color-corrected green pixel value $C_G^{ccm}$, and a color-corrected blue pixel value $C_B^{ccm}$ by multiplying a 1×4 matrix by a 4×3 color correction matrix, wherein the 1×4 matrix comprises the clipped, white-balanced red pixel value $C_R^{WB,clipped}$, a clipped, white-balanced green pixel value $C_G^{wb,clipped}$, a clipped, white-balanced blue pixel value $C_B^{wb,clipped}$, and a clipped, white-balanced infrared pixel value $C_{IR}^{wb,clipped}$;
  determining a clipped, color-corrected red pixel value $C_R^{ccm,clipped}$ by replacing color corrected red pixel values $C_R^{ccm}$ greater than 1 with the value of 1 and replacing color-corrected red pixel values $C_R^{ccm}$ less than 0 with the value of 0;
  determining an interpolation coefficient α for the first pixel based on the clipped, color-corrected red pixel value $C_R^{ccm,clipped}$, a clipped, color-corrected green pixel value $C_G^{ccm,clipped}$, and a clipped, color-corrected blue pixel value $C_B^{ccm,clipped}$;
  determining a first luminance value for the first pixel $C^{luma}$ using a weighted combination of the input red pixel value, the input green pixel value, and the input blue pixel value; and
  determining a modified red pixel value by interpolating between $C^{luma}$ and an unclipped, color-corrected red pixel value $C_R^{ccm,unclipped}$ using the interpolation coefficient α.

2. The method of claim 1, further comprising:
  determining the unclipped, color-corrected red pixel value by multiplying a 1×4 matrix comprising the white-balanced red pixel value $C_R^{wb}$ for the first pixel, a white-balanced green pixel value $C_G^{wb}$, a white-balanced blue pixel value $C_B^{wb}$, and a white-balanced infrared pixel value $C_{IR}^{wb}$ by the 4×3 color correction matrix.

3. The method of claim 1, wherein the interpolation coefficient α increases as an average saturation level of $C_R^{ccm,clipped}+C_G^{ccm,clipped}+C_B^{ccm,clipped}$ increases.

4. The method of claim 3, further comprising determining the modified red pixel value using:
  modified red pixel value=$(1-\alpha) \cdot C_R^{ccm}+\alpha \cdot C^{luma}$, where $C_R^{ccm}$ is the unclipped, color-corrected red pixel value.

5. A method comprising:
  receiving first pixel data;
  determining an interpolation coefficient based at least in part on a clipped pixel value determined based on the first pixel data;
  determining second pixel data based on fusing together
    color-corrected pixel values determined based on the first pixel data, and
    non-color-corrected pixel values determined based on the first pixel data;
  wherein fusing together the color-corrected pixel values and the non-color-corrected pixel values comprises determining, for each respective channel of a plurality of color channels, a respective blended pixel value for the respective channel based on summing together resultant values from
    multiplying one of the color-corrected pixel values corresponding to the respective channel by a first value determined based on the interpolation coefficient, and multiplying one of the non-color-corrected pixel values corresponding to the respective channel by a second value determined based on the interpolation coefficient; and wherein the second pixel data comprises the blended pixel values.

6. The method of claim 5, wherein the first pixel data comprises a value corresponding to a first color channel, a value corresponding to a second color channel, a value corresponding to a third color channel, and a value corresponding to an infrared color channel.

7. The method of claim 6, wherein the method comprises:
determining, based on the first pixel data, a set of white balance gained pixel values including a value corresponding to a first color channel, a value corresponding to a second color channel, a value corresponding to a third color channel, and a value corresponding to an infrared color channel;
determining, based at least in part on the set of white balance gained pixel values and a set of color correction values, a first set of white balanced gained color corrected pixel values, the determining of the first set of white balance gained color corrected pixel values comprising
determining that a third value is outside of a first range, based on the determining that the third value is outside of the first range,
determining a fourth value based on a value that is inside of the first range;
wherein the interpolation coefficient is determined based at least in part on values of the set of white balance gained color corrected pixel values.

8. The method of claim 7, wherein the set of color correction values is stored in a color correction matrix.

9. The method of claim 7, wherein the method further comprises determining, based at least in part on the set of white balance gained pixel values and the set of color correction values, a second set of white balanced gained color corrected pixel values; and
wherein the second set of white balance gained color corrected pixel values comprises the color-corrected pixel values.

10. The method of claim 7, wherein the interpolation coefficient is determined based on use of a recovery strength parameter.

11. The method of claim 7, wherein the method comprises
determining a fifth value based at least in part on summing together values determined based on the set of white balance gained color corrected pixel values,
determining a sixth value based on a configuration parameter,
determining a seventh value based on the fifth value and the sixth value; and
wherein the interpolation coefficient is determined based at least in part on raising Euler's number to a power corresponding to the seventh value.

12. The method of claim 5, wherein the first pixel data comprises a value corresponding to a first color channel, a value corresponding to a second color channel, a value corresponding to a third color channel, and a value corresponding to an infrared color channel; and
wherein the second pixel data comprises a value corresponding to the first color channel, a value corresponding to the second color channel, and a value corresponding to the third color channel.

13. The method of claim 5, wherein the non-color-corrected pixel values are luminance values determined based on the first pixel data.

14. The method of claim 7, wherein the non-color-corrected pixel values comprise values from the set of white balance gained pixel values.

15. The method of claim 14, wherein the non-color-corrected pixel values comprise a value corresponding to the first color channel, a value corresponding to the second color channel, and a value corresponding to the third color channel.

16. The method of claim 14, wherein the second value comprises the interpolation coefficient and the first value is determined based on subtracting the interpolation coefficient from one.

17. The method of claim 14, wherein the first value comprises the interpolation coefficient and the second value is determined based on subtracting the interpolation coefficient from one.

18. The method of claim 5, wherein the method further comprises providing the second pixel data as input to a gamma correction process, an RGB to YUV conversion process, or a scaling process.

19. A system comprising:
one or more processors;
non-transitory computer-readable memory;
one or more multiplier circuits; and
the one or more processors effective to:
receive first pixel data;
determine an interpolation coefficient based at least in part on a clipped pixel value determined based on the first pixel data;
determine second pixel data based on fusing together color-corrected pixel values determined based on the first pixel data, and
non-color-corrected pixel values determined based on the first pixel data;
the one or more multiplier circuits effective to:
determine, for each respective channel of a plurality of color channels, a respective blended pixel value for the respective channel based on summing together resultant values by
multiplying one of the color-corrected pixel values corresponding to the respective channel by a first value determined based on the interpolation coefficient, and
multiplying one of the non-color-corrected pixel values corresponding to the respective channel by a second value determined based on the interpolation coefficient; and
wherein the second pixel data comprises the blended pixel values.

20. The system of claim 19, wherein the first pixel data comprises a value corresponding to a first color channel, a value corresponding to a second color channel, a value corresponding to a third color channel, and a value corresponding to an infrared color channel.

21. The system of claim 20, wherein the one or more processors are further effective to:
determine, based on the first pixel data, a set of white balance gained pixel values including a value corresponding to a first color channel, a value corresponding to a second color channel, a value corresponding to a third color channel, and a value corresponding to an infrared color channel;
determine, based at least in part on the set of white balance gained pixel values and a set of color correction values, a first set of white balanced gained color corrected pixel values, wherein, to determine the first set of white balance gained color corrected pixel values, the one or more processors are further effective to:
determine that a third value is outside of a first range, based on the determination that the third value is outside of the first range,
determine a fourth value based on a value that is inside of the first range;
wherein the interpolation coefficient is determined based at least in part on values of the set of white balance gained color corrected pixel values.

22. The system of claim 21, wherein the set of color correction values is stored in a color correction matrix.

\* \* \* \* \*